United States Patent [19]

Honda et al.

[11] 4,227,956
[45] Oct. 14, 1980

[54] HOT-MELT ADHESION PROCESS FOR VULCANIZED RUBBER

[75] Inventors: Toshio Honda, Akigawa; Yukio Fukuura, Kodaira; Itsuo Tanuma, Tokorozawa; Hikaru Ishikawa, Kokubunji; Masao Ogawa, Kawagoe; Shozo Kojima; Kazunori Ueno, both of Higashimurayama, all of Japan

[73] Assignee: Bridgestone Tire Company, Limited, Tokyo, Japan

[21] Appl. No.: 36,933

[22] Filed: May 7, 1979

[30] Foreign Application Priority Data

May 10, 1978 [JP] Japan .................................. 53-54365

[51] Int. Cl.$^2$ ............................................. C09J 3/12
[52] U.S. Cl. ..................................... 156/334; 156/338
[58] Field of Search .............. 156/325, 326, 327, 334, 156/338

[56] References Cited
U.S. PATENT DOCUMENTS 3,546,041  12/1970  Burns et al. ...................... 156/334 X Primary Examiner—Bernard D. Pianalto
Attorney, Agent, or Firm—Sughrue, Rothwell, Mion, Zinn and Macpeak

[57] ABSTRACT

A vulcanized rubber composition containing at least 30% by weight, based on the amount of the rubber component, of syndiotactic-1,2-polybutadiene has a high adhesion, and can be easily and firmly adhered to another vulcanized rubber composition or to a porous material through a syndiotactic-1,2-polybutadiene thin film by a hot-melt adhesion process.

2 Claims, 2 Drawing Figures

HOT-MELT ADHESION PROCESS FOR VULCANIZED RUBBER

BACKGROUND OF THE INVENTION (1) Field of the Invention:

The present invention relates to a hot-melt adhesion process for vulcanized rubber.

(2) Description of the Prior Art:

When a vulcanized rubber compositiin is adhered to the same or different kind vulcanized rubber composition or a porous material, such as cloth, paper, leather, wood or the like, by a conventional hot-melt process, it is necessary to buff the surface of both the members. Moreover, it is troublesome to select properly a suitable kind of hot-melt adhesive depending upon the kind of the vulcanized rubber. Further, a satisfactorily high bonding strength can not always be obtained therefore a need exists to overcome these drawbacks.

The inventors have made various investigations in order to solve these drawbacks and found that, when a vulcanized rubber composition, whose rubber component contains syndiotactic-1,2-polybutadiene, is adhered to another member by the hot-melt process in the presence of a syndiotactic-1,2-polybutadiene thin film interposed between the surfaces of the members to be adhered very high adhesion can be obtained without previously carrying out troublesome step of buffing the surfaces.

Syndiotactic-1,2-polybutadiene is a thermoplastic resin having a melting point of 80°–90° C. and a low melt viscosity. Therefore, this resin has hitherto been used as a hot-melt adhesive for porous materials, such as paper, cloth, leather, wood and the like. The present invention aims to apply the hot-melt adhesion process by this resin to the bonding of vulcanized rubber composition.

SUMMARY OF THE INVENTION

The feature of the present invention is the provision of a hot-melt adhesion process for vulcanized rubber, comprising hot pressing a first member consisting of a vulcanized rubber composition, whose rubber component contains at least 30% by weight of syndiotactic-1,2-polybutadiene, to a second member in the presence of a hot-melt adhesive consisting of a syndiotactic-1,2-polybutadiene thin film interposed between the members.

According to the present invention, a first member of a vulcanized rubber composition containing a blend of syndiotactic-1,2 -polybutadiene with natural rubber, various synthetic rubbers or blends thereof can be easily bonded in a high adhesion to a second member without carrying out any surface treatment. Accordingly, the present invention can be widely applied independently of the kind of rubber to be blended with syndiotactic-1,2-polybudadiene. For example, a rubber composition containing syndiotactic-1,2-polybudadiene and ethylene-propylene-diene terpolymer has a high weather resistance, and therefore a waterproof sheet can be obtained by bonding a large number of sheets made of such a rubber composition by the process of the present invention. The waterproof sheet is superior to waterproof sheets produced by bonding other vulcanized rubber sheets or polyvinyl chloride sheets in the waterproofness at the bonding portion.

DETAILED DESCRIPTION OF THE INVENTION

Figure 1:
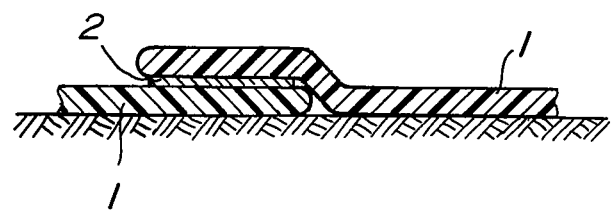
FIG. 1 is a cross-sectional view of a bonding portion of rubber sheets, which illustrates one embodiment of the hot-melt adhesion process according to the present invention.

The vulcanized rubber composition to be used as a first member in the present invention must contain at least 30% by weight of syndiotactic-1,2-polybutadiene based on the amount of the rubber component. Commonly used syndiotactic-1,2-polybutadiene contains at least 90% of 1,2-bond and has a number average molecular weight of 100,000-200,000, a crystallinity of about 15-35% and a melting point of 75°–95° C.

When the amount of syndiotactic-1,2-polybutadiene contained in the rubber component is smaller than 30% by weight, a vulcanized rubber composition having a sufficiently high adhesion can not be obtained.

Another rubber component preferably used with syndiotactic-1,2-polybutadiene in the vulcanized rubber composition is any of natural rubber, polyisoprone rubber, polybutadiene rubber, styrene-butadiene rubber, ethylenepropylene rubber, ethylene-propylene-diene rubber, isopreneisobutylene rubber, acrylonitrile-butadiene rubber, chloroprene rubber and the like.

Syndiotactic-1,2-polybutadine is superior to other resins in the compatibility with the above described rubbers and is easily vulcanized together with the rubbers. Moreover, since syndiotactic-1,2-polybutadine has not unsaturated bond in the main chain, a rubber composition, whose rubber component contains at least 30% by weight of syndiotactic-1,2-polybutadiene, is excellent in the weather resistance and moldability.

A rubber composition containing syndiotactic-1,2-polybutadiene is used in various purposes. Particularly, when it is intended to use this rubber composition as a waterproof sheet, the rubber component is preferred to be a blend of syndiotactic-1,2-polybutadiene and ethylenepropylene-diene rubber in view of the weather resistance of the resulting waterproof sheet.

However, when the amount of syndiotactic-1,2-polybutadiene is excessively large, the resulting rubber composition has an excessively high hardness and often loses properties peculiar to rubber composition. Accordingly, the amount of syndiotactic-1,2-polybutadiene should be limited depending upon the purpose. For example, the blending ratio of syndiotactic-1,2-polybutadiene/ethylene-propylene-diene rubber suitable for a waterproof sheet is 30/70-80/20 in view of retention of the property as a rubber sheet and workability.

The vulcanized rubber composition may contain vulcanizing agent, vulcanization accelerator, antioxidant, reinforcing agents, such as carbon black and the like, and other conventional ingredients. The vulcanized rubber composition can be produced by any crosslinking processes, such as sulfur vulcanization, peroxide crosslinking, ultraviolet light curing and the like.

The second member to be adhered to the first member includes the rubber compositions defined as the first member and porous materials, such as paper, cloth, leather, wood and like. Metal and glass are poor in the adhesion to thin film of syndiotactic-1,2-polybutadiene, and are not suitable to be used as a second member.

The hot-melt adhesive to be used in the present invention is a thin film of the same syndiotactic-1,2-polybutadiene as that contained in the first member. The thickness of the thin film is preferred to be 0.01-1 mm. When a film having a thickness of smaller than 0.01 mm is used, the film is poor in the fluidity as an adhesive and can not sufficiently penetrate the interface of the first and second members, and hence desired bonding strength can not be obtained. While, when a film having a thickness of larger than 1 mm is used, a long period of time is required in the melting of the film, and the use of such thick film is not practical.

The hot-melt bonding of the first member to the second member is carried out in the following manner. The above described syndiotactic-1,2-polybutadiene thin film is interposed between the surface to be bonded of the first member and that of the second member, and the members are hot pressed together.

In the present invention, it is not necessary to subject the first and second members to particular pretreatments, such as buffing and the like, and sufficiently high bonding strength can be obtained by merely wiping off oil and grease smears. In the hot pressing step, the heatng is carried out within the temperature range of 100°-200° C., and the heating time can be optionally selected depending upon the thickness of the first or second member, thickness of the thin film and the heating temperature.

The heating tools used in the invention are the conventional ones, such as hot irons, automatic welding machines for strip welding, hand-operated semi-automatic welding machines and the like. A satisfactorily high bonding strength can be obtained when the two members are pressed together by hand in the case of the use of a hot iron or by a roller or the like in the case of the use of a semi-automatic welding machine.

Figure 2:
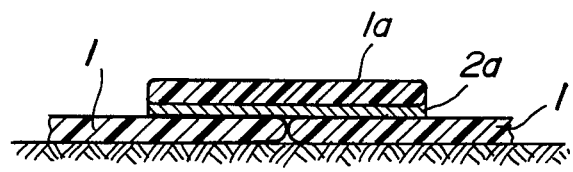
FIG. 2 is a cross-sectional view of a bonding portion of rubber sheets, which illustrates another embodiment of the hot-melt adhesion process according to the present invention.

The adhesion process, when the second member is the same kind of rubber composition as the first member, is illustrated using for an example two waterproof sheets. A thin film 2 is interposed between the lapped portion of two waterproof sheets 1 and 1 as illustrated in FIG. 1, and the lapped portion is hot pressed. Alternatively, the surface of the vulcanized rubber composition 1a used in the above described first member is previosly coated with a thin film 2a by a hot press to prepare an adhesive tape, and the adhesive tape is arranged on the butt joint portion of the waterproof sheets 1 and 1 as illustrated in FIG. 2, and the joint portion is hot pressed together with the adhesive tape. In bonding waterproof sheets, an adherent layer consisting of a vulcanizable rubber may be laminated on the surface of the sheets, which contacts with the ground, in order to improve the workability of the sheets and the compatibility of the sheets with the ground. However, when such sheets are bonded by the lap joint method illustrated in FIG. 1, an adherent layer laminated on the surface, which will be contacted with the thin film 2, must be removed before the bonding. However, the butt joint method illustrated in FIG. 2 can be carried out without removing the adherent layer.

Of course, even when the second member is a porous material, such as cloth, paper, leather, wood or the like, the above described lap joint method and butt joint method can be carried out similarly.

The following examples are given for the purpose of illustration of this invention and are not intended as limitations thereof. In the examples, "parts" mean parts by weight.

EXAMPLE 1

Physical properties and adhesion properties of valcanized rubber produced by the use of a blend of ethylenepropylene-ethylidenenorbornene terpolymer having an iodine value of 26 (trademark: JSR EP-33, made by Japan Synthetic Rubber Co., hereinafter abbreviated as EPDM) and a variant amount of syndiotactic-1,2-polybutadiene (trademark: JSR RB 820, made by Japan Synthetic Rubber Co., hereinafter abbreviated as RB 820) were evaluated.

The vulcanized rubber has a compounding recipe of 100 parts of the total amount of EPDM and RB 820, 50 parts of ISAF carbon black, 5 parts of process oil, 2 parts of stearic acid, 1 part of paraffin wax, 1 part of N-isopropyl-N'-phenyl-p-phenylenediamine (trademark: Nocrac 810 NA, made by Ouchi Shinko Chemical Co.), 2 parts of rosin as a tackifier, 5 parts of zinc oxide, 2 parts of sulfur and 1 part of N-oxyethylene-2-benzothiazolesulfenamide (trademark: Nocceler MSA, made by Ouchi Shinko Chemical Co.). The vulcanized rubber was produced under a vulcanization condition of 160° C.×20 min. The vulcanized rubber was punched by a JIS No. 3 dumbell to prepare a test piece, and the test piece was pulled at a rate of 300 mm/min, whereby physical properties of the vulcanized rubber were evaluated.

The adhesion properties of the vulcanized rubber was evaluated in the following manner. Two vulcanized rubber sheets having a length of 150 mm, a width of 60 mm and a thickness of 2 mm were used, and the surface to be bonded of each sheet was washed with n-hexane. A sheet made of RB 820 and having a thickness of 1 mm was arranged between the above treated vulcanized rubber sheets as illustrated in FIG. 1, and the lapped rubber sheets were hot pressed in a mold having a depth of 5 mm at a temperature of 150° C. for 5 minutes to bond the lapped rubber sheets through a melted BR 820 thin film and then the bonded rubber sheets were cooled to room temperature. A test piece for adhesion test was punched out from the bonded rubber sheets by means of an oblong cutter (1"×6"), and the test piece was subjected to a T-shape peeling test at a rate of 50 mm/min by means of a tensile tester.

The obtained results are shown in the following Table 1.

TABLE 1

| Test No. | 1 | 2 | 3 | 4 | 5 | 6 | 7 | 8 | 9 |
|---|---|---|---|---|---|---|---|---|---|
| Compounding recipe (parts) | | | | | | | | | |
| EPDM | 100 | 90 | 80 | 70 | 60 | 40 | 20 | 10 | |
| RB 820 | | 10 | 20 | 30 | 40 | 60 | 80 | 90 | 100 |
| ISAF | 50 | 50 | 50 | 50 | 50 | 50 | 50 | 50 | 50 |
| Process oil | 5 | 5 | 5 | 5 | 5 | 5 | 5 | 5 | 5 |
| Stearic acid | 2 | 2 | 2 | 2 | 2 | 2 | 2 | 2 | 2 |
| Paraffin wax | 1 | 1 | 1 | 1 | 1 | 1 | 1 | 1 | 1 |
| Nocrac 810 NA | 1.5 | 1.5 | 1.5 | 1.5 | 1.5 | 1.5 | 1.5 | 1.5 | 1.5 |

TABLE 1-continued

| Test No. | 1 | 2 | 3 | 4 | 5 | 6 | 7 | 8 | 9 |
|---|---|---|---|---|---|---|---|---|---|
| Rosin | 2 | 2 | 2 | 2 | 2 | 2 | 2 | 2 | 2 |
| Zinc oxide | 5 | 5 | 5 | 5 | 5 | 5 | 5 | 5 | 5 |
| Sulfur | 2 | 2 | 2 | 2 | 2 | 2 | 2 | 2 | 2 |
| Nocceler MSA | 1 | 1 | 1 | 1 | 1 | 1 | 1 | 1 | 1 |
| Physical properties | | | | | | | | | |
| Hardness, Hd (JIS A) | 69 | 74 | 75 | 76 | 80 | 82 | 86 | 87 | 88 |
| 100% Mod (kg/cm$^2$) | 29 | 33 | 43 | 45 | 50 | 56 | 64 | 70 | 72 |
| 300% Mod (kg/cm$^2$) | 86 | 93 | 100 | 105 | 105 | 105 | 107 | 110 | 115 |
| Tensile strength at break, Tb (kg/cm$^2$) | 177 | 175 | 173 | 183 | 180 | 179 | 169 | 160 | 148 |
| Elongation at break, Eb (%) | 470 | 440 | 405 | 495 | 475 | 540 | 575 | 570 | 545 |

TABLE I(b)

| Test No. | 1 | 2 | 3 | 4 | 5 | 6 | 7 | 8 | 9 |
|---|---|---|---|---|---|---|---|---|---|
| Adhesion properties | | | | | | | | | |
| Bonding strength (kg/25 mm) | 10.3 | 13.5 | 12.5 | 22 | 21 | 33 | 40< | 40< | 40< |
| Type of bond failure* | (A) | (A) | (A) | (B) | (B) | (C) | (D) | (D) | (D) |

*Type of bond failure
(A) : Adhesion to rubber failure
(B) : Rubber failure and adhesion to rubber failure
(C) : Adhesion failure
(D) : Rubber failure It can be seen from Table 1 that a vulcanized rubber composition, whose rubber component contains at least 30% by weight of syndiotactic-1,2-polybutadiene, has a remakably excellent adhesion.

EXAMPLE 2

Ozone resistance and ultraviolet light resistance of the vulcanized rubber sheets produced in Example 1 were examined.

In the ozone resistance test, each of strip-shaped test pieces having a length of 60 mm, a width of 10 mm and a thickness of 2 mm was elongated by 40 % and the elongated test piece was treated for 168 hours under an atmosphere having an ozone concentration of 90 pphm and kept at 40° C. After the treatment, the rubber surface was observed by a magnifying glass of 10 magnifications.

In the ultraviolet light resistance test, a test piece was punched out from each of the above obtained vulcanized rubber sheets having a thickness of 2 mm by means of a JIS No. 3 dumbell, and the test piece was located at a position distant from a 400 W mercury lamp by 15 cm and exposed to an ultraviolet light of about 19,000 μW for 8 hours. Then, a tensile test of the irradiated test piece was carried oiut at a rate of 300 mm/min by means of a tensile tester. Further, the values of tensile strength at break and elongation at break of the test piece after the irradiation were compared with the original values, and the decreased percentage of these values were calculated.

The obtained results are shown in the following Table 2.

TABLE 2

| Test No. | 1 | 2 | 3 | 4 | 5 | 6 | 7 | 8 | 9 |
|---|---|---|---|---|---|---|---|---|---|
| Blending ratio (parts) | | | | | | | | | |
| EPDM | 100 | 90 | 80 | 70 | 60 | 40 | 20 | 10 | |
| RB 820 | | 10 | 20 | 30 | 40 | 60 | 80 | 90 | 100 |
| Ozone resistance (after exposure of 90 pphm × 168 hrs. at 40° C. under 40% elongation) | no crack | no crack | no crack | no crack | no crack | no crack | no crack | no crack | no crack |
| Ultraviolet light resistance (after exposure of 19,000 μW × 8 hrs.) | | | | | | | | | |
| Hardness, Hd (JIS A) | 70 | | 76 | 77 | 80 | 86 | 88 | | 90 |
| Tensile strength at break, Tb (kg/cm$^2$) | 170 | | 169 | 181 | 175 | 161 | 154 | | 150 |
| Elongation at break, Eb(%) | 460 | | 400 | 495 | 483 | 510 | 545 | | 540 |
| Decreased percentage of TB, (%) | −4 | | −2 | −1 | −3 | −10 | −9 | | +1 |
| Decreased percentage of Eb, (%) | −2 | | −1 | 0 | +2 | −6 | −5 | | −1 |

What is claimed is:

1. A hot-melt adhesion process for vulcanized rubber, comprising hot pressing a first member consisting of a vulcanized rubber composition, whose rubber component contains at least 30% by weight of syndiotactic-1,2-polybutadiene, to a second member comprising a rubber composition defined as the first member or a porous material, such as cloth, paper, leather or wood in the presence of a hot-melt adhesive consisting of a syndiotactic-1,2-polybutadiene thin film interposed between the members.

2. A hot-melt adhesion process according to claim 1, wherein said hot-melt adhesive has a thickness of 0.01–1 mm.